(12) United States Patent
Tabet et al.

(10) Patent No.: US 10,499,451 B2
(45) Date of Patent: Dec. 3, 2019

(54) ADAPTIVE C-DRX MANAGEMENT

(71) Applicant: Apple Inc., Cupertino, CA (US)

(72) Inventors: Tarik Tabet, Los Gatos, CA (US);
Ajoy K. Singh, Milpitas, CA (US);
Sarma V. Vangala, San Jose, CA (US);
Vinay R. Majjigi, Sunnyvale, CA (US);
Samy Khay-Ibbat, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 14/710,925

(22) Filed: May 13, 2015

(65) Prior Publication Data

US 2015/0365995 A1 Dec. 17, 2015

Related U.S. Application Data

(60) Provisional application No. 62/011,666, filed on Jun. 13, 2014.

(51) Int. Cl.
*H04W 72/04* (2009.01)
*H04W 76/28* (2018.01)

(52) U.S. Cl.
CPC ......... *H04W 76/28* (2018.02); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/168* (2018.01); *Y02D 70/24* (2018.01); *Y02D 70/26* (2018.01)

(58) Field of Classification Search
CPC .................................................. H04W 76/048
See application file for complete search history.

(56) References Cited

U.S. PATENT DOCUMENTS 8,218,526 B2 * 7/2012 Bertrand ........... H04W 56/0005
370/350
8,582,483 B1 * 11/2013 Yu ....................... H04W 76/048
370/311

(Continued)

FOREIGN PATENT DOCUMENTS

CN 102932884 2/2013
WO WO2012/109576 A1 8/2012

(Continued)

OTHER PUBLICATIONS

Office Action for ROC (Taiwan) Patent Application No. 104116885, dated Aug. 22, 2016, pp. 1-15.

(Continued)

*Primary Examiner* — Sulaiman Nooristany
(74) *Attorney, Agent, or Firm* — Meyertons Hood Kivlin Kowert and Goetzel PC; Jeffrey C. Hood

(57) ABSTRACT

This disclosure relates to techniques for adaptive C-DRX Management. A wireless device and a cellular base station may establish a cellular link. According to some embodiments, the base station may monitor upcoming traffic with the wireless device. Based at least in part on the upcoming traffic for the wireless device, the base station may provide a command indicating to the wireless device to enter C-DRX. The command may further indicate to the wireless device a number of C-DRX cycles through which to remain in a low power state.

20 Claims, 6 Drawing Sheets

(56) References Cited

U.S. PATENT DOCUMENTS

| | | | |
|---|---|---|---|
| 9,332,584 B2* | 5/2016 | Verger | H04W 76/048 |
| 9,479,957 B2* | 10/2016 | Lee | H04W 76/023 |
| 2007/0259699 A1* | 11/2007 | Homchaudhuri | H04W 52/0216 455/574 |
| 2009/0168731 A1* | 7/2009 | Zhang | H04L 1/1854 370/336 |
| 2009/0238098 A1* | 9/2009 | Cai | H04W 76/048 370/254 |
| 2009/0239568 A1* | 9/2009 | Bertrand | H04W 52/0225 455/522 |
| 2009/0247203 A1* | 10/2009 | Kuo | H04W 76/048 455/509 |
| 2011/0026625 A1* | 2/2011 | Susitaival | H04W 52/0251 375/260 |
| 2011/0075558 A1* | 3/2011 | Isaksson | H04L 47/215 370/230.1 |
| 2011/0112221 A1* | 5/2011 | Lejeune | C08G 77/14 523/425 |
| 2011/0176463 A1* | 7/2011 | Cowan | H04W 52/0216 370/311 |
| 2011/0188428 A1* | 8/2011 | Ishii | H04W 72/04 370/311 |
| 2011/0199910 A1* | 8/2011 | Oh | H04W 52/0229 370/241 |
| 2012/0069816 A1* | 3/2012 | Bhandari | H04W 48/20 370/331 |
| 2012/0207069 A1* | 8/2012 | Xu | H04W 52/0222 370/311 |
| 2013/0016638 A1* | 1/2013 | Lee | H04W 52/0251 370/311 |
| 2013/0084848 A1* | 4/2013 | Dalsgaard | H04W 52/0216 455/422.1 |
| 2013/0107727 A1* | 5/2013 | Lunden | H04W 52/0251 370/252 |
| 2013/0121220 A1 | 5/2013 | Virtej | |
| 2013/0194990 A1* | 8/2013 | Banister | H04W 24/10 370/311 |
| 2013/0194994 A1* | 8/2013 | Dayal | H04W 72/1215 370/311 |
| 2013/0201851 A1* | 8/2013 | Chou | H04W 24/02 370/252 |
| 2013/0229931 A1* | 9/2013 | Kim | H04W 24/10 370/252 |
| 2013/0265987 A1* | 10/2013 | Ramachandran | H04W 36/0033 370/331 |
| 2013/0297810 A1* | 11/2013 | Ho | H04W 76/14 709/228 |
| 2013/0308510 A1* | 11/2013 | Ji | H04W 88/02 370/311 |
| 2014/0036748 A1* | 2/2014 | Mukherjee | H04W 52/0212 370/311 |
| 2014/0038579 A1* | 2/2014 | Henttonen | H04W 8/22 455/418 |
| 2014/0086123 A1* | 3/2014 | Deivasigamani | H04W 76/048 370/311 |
| 2014/0098694 A1* | 4/2014 | Damji | H04W 52/0229 370/252 |
| 2014/0105087 A1* | 4/2014 | Gupta | H04B 15/00 370/311 |
| 2014/0112221 A1* | 4/2014 | Verger | H04W 52/0216 370/311 |
| 2014/0171071 A1* | 6/2014 | Venkata | H04W 48/18 455/434 |
| 2014/0211673 A1* | 7/2014 | Lu | H04W 52/0212 370/311 |
| 2014/0307603 A1* | 10/2014 | Barany | H04W 52/02 370/311 |
| 2014/0348046 A1* | 11/2014 | Feng | H04W 52/0229 370/311 |
| 2015/0009816 A1* | 1/2015 | Hsu | H04W 28/0221 370/230.1 |
| 2015/0056985 A1* | 2/2015 | Swaminathan | H04W 88/06 455/432.1 |
| 2015/0063244 A1* | 3/2015 | Wang | H04J 11/0056 370/329 |
| 2015/0085728 A1* | 3/2015 | Majjigi | H04W 72/042 370/311 |
| 2015/0098452 A1* | 4/2015 | Dalsgaard | H04W 76/048 370/336 |
| 2015/0131504 A1* | 5/2015 | Lin | H04W 52/0225 370/311 |
| 2015/0163745 A1* | 6/2015 | Kim | H04W 52/0235 370/311 |
| 2015/0173039 A1* | 6/2015 | Rune | H04W 52/0216 370/311 |
| 2015/0173103 A1* | 6/2015 | Lunden | H04L 67/1097 370/331 |
| 2015/0201375 A1* | 7/2015 | Vannithamby | H04W 24/04 370/311 |
| 2015/0341858 A1* | 11/2015 | Hwang | H04W 52/0225 370/311 |
| 2015/0351151 A1* | 12/2015 | Huang | H04W 36/0083 370/252 |
| 2015/0359035 A1* | 12/2015 | Lee | H04W 52/0235 370/311 |
| 2016/0143086 A1* | 5/2016 | Kahtava | H04L 1/00 370/311 |
| 2016/0286486 A1* | 9/2016 | Nobusawa | H04W 52/0216 |
| 2017/0196042 A1* | 7/2017 | Shah | H04W 76/028 |

FOREIGN PATENT DOCUMENTS

| | | |
|---|---|---|
| WO | 2014070933 | 5/2014 |
| WO | 2014113023 | 7/2014 |

OTHER PUBLICATIONS

International Search Report & Written Opinion, Application No. PCT/US2015/030777, dated Sep. 9, 2015, 12 pages.

"Medium Access Control (MAC) protocol specification", 3rd Generation Partnership Project (3GPP), Mar. 20, 2014, 58 pages, Release 11, Valbonne, France.

Office Action, Chinese Application for Invention No. 201580026279.3, dated Mar. 28, 2019, five pages.

* cited by examiner

ADAPTIVE C-DRX MANAGEMENT

PRIORITY CLAIM

The present application claims benefit of priority to U.S. Provisional Application No. 62/011,666 titled "Adaptive C-DRX Management" and filed on Jun. 13, 2014, which is hereby incorporated by reference in its entirety as though fully and completely set forth herein.

FIELD

The present application relates to wireless devices, and more particularly to systems and methods for reducing the power consumption of wireless devices by adaptively managing their C-DRX operation.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Cellular communication technologies may be capable of providing a variety of services, and may be used by a variety of applications. Different applications utilizing cellular communication may have different characteristics. Cellular communication techniques which do not take into account the different application characteristics of the various applications utilizing cellular communication may operate inefficiently. Accordingly, improvements in the field would be desirable.

SUMMARY

Embodiments are presented herein of methods for reducing the power consumption of wireless devices by managing their connected-mode discontinuous reception (C-DRX) operation, in particular based on application traffic characteristics, and of devices configured to implement the methods.

According to some embodiments, a wireless device and/or a cellular base station may analyze previous traffic and/or monitor upcoming traffic between the wireless device and the cellular base station. If certain conditions are met, such as if there is no upcoming traffic for at least a certain amount of time, the cellular base station may determine to transition the wireless device to C-DRX. Under such circumstances, the base station may provide a command to the wireless device indicating to the wireless device to transition to C-DRX. This may occur prior to expiration of a C-DRX inactivity timer for the wireless device, or possibly even prior to initiation of a C-DRX inactivity timer for the wireless device, at least in some instances.

In some instances, the knowledge of previous traffic patterns and/or upcoming scheduling information for the wireless device may allow the base station to determine that it is possible for the wireless device to skip (e.g., remain in a low power state through the scheduled on-duration of) a certain number of C-DRX cycles immediately following transitioning to C-DRX without sacrificing performance. In such a case, the base station may indicate this number of C-DRX cycles which may be skipped (e.g., in the same command indicating to the wireless device to transition to C-DRX or in a different indication), and the wireless device may skip the indicated number of C-DRX cycles. At least in some instances, the base station may further refrain from providing grants to the wireless device during even the on-duration portions of the indicated number of C-DRX cycles.

In some instances, the decision to transition a wireless device to C-DRX, the parameters of the C-DRX operation, and/or the number of C-DRX cycles to skip may be informed by the type(s) of application traffic currently or recently being exchanged between the wireless device and the base station. For example, timing patterns, packet size patterns, quality of service class indicators (QCIs), and/or any of various other information which may be obtained or inferred from previous traffic may be used to predict future traffic patterns and thus to select appropriate C-DRX cycle length and/or other parameters.

Note that analysis of previous traffic, monitoring of upcoming traffic, and decisions regarding C-DRX operation based on such analysis and monitoring may be performed by either or both of the wireless device and the base station. For example, in some instances, a wireless device may determine to transition to C-DRX prior to expiration of its C-DRX inactivity timer based on such analysis and/or monitoring and request early C-DRX entry from the base station. The base station may agree and provide an indication to transition to C-DRX based solely on the wireless device's request, or may determine based on its own analysis and/or monitoring activity whether to respond to wireless device's request by provide an indication to transition to C-DRX. As another possibility, the base station may determine to provide an indication to transition to C-DRX to a wireless device independently of any indication or request from the wireless device, e.g., based solely on its own analysis and monitoring.

The techniques described herein may be implemented in and/or used with a number of different types of devices, including but not limited to cellular phones, cellular base stations, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
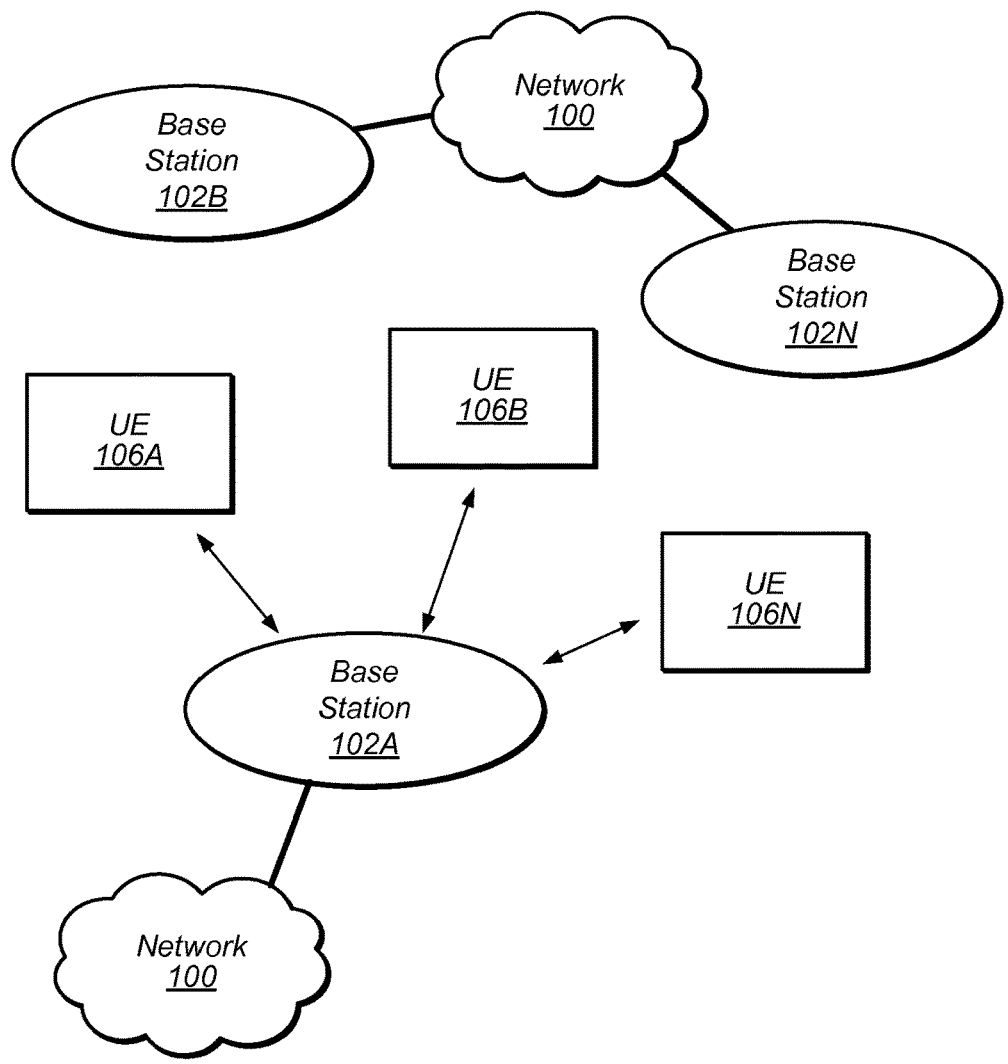
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
EPC: Evolved Packet Core
MME: Mobility Management Entity
HSS: Home Subscriber Server
SGW: Serving Gateway
RLC: Radio Link Control
RRC: Radio Resource Control
MAC: Media Access Control
IE: Information Element Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
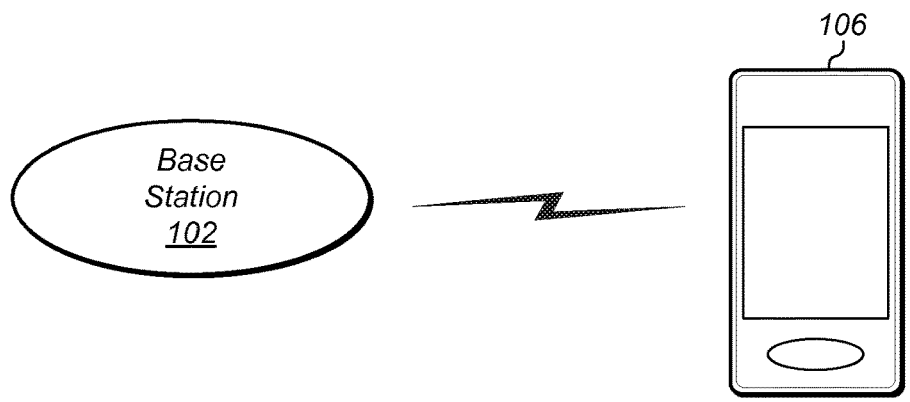
FIG. 2 illustrates a base station (BS) in communication with a user equipment (UE) device, according to some embodiments.
Figure 3:
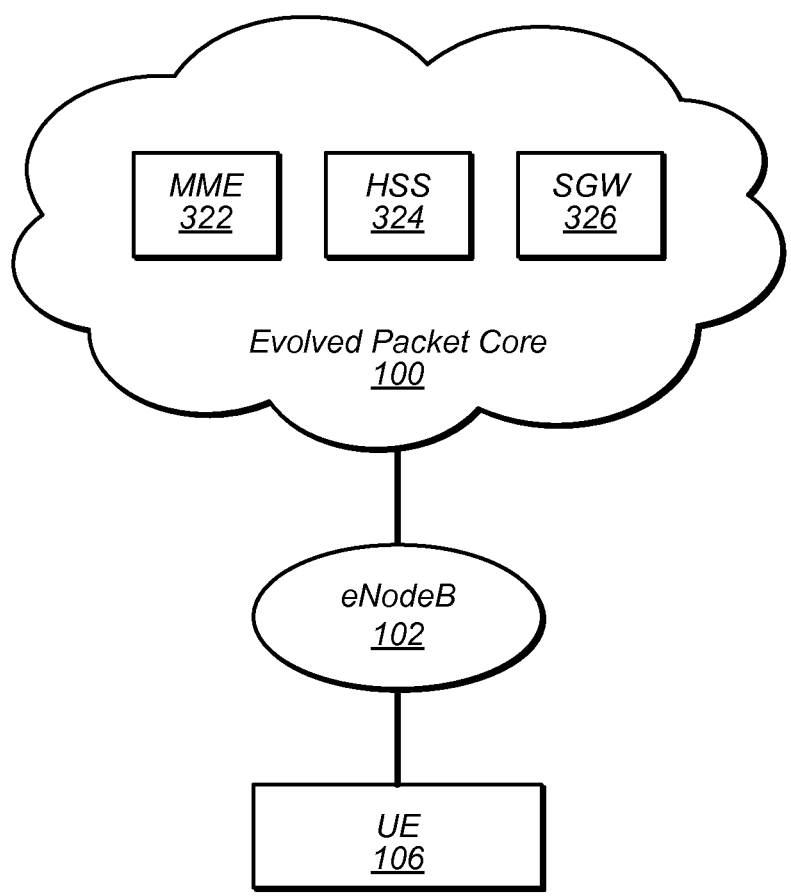
FIG. 3 illustrates an exemplary (and simplified) cellular network architecture, according to some embodiments.

FIGS. 1-3—Communication System

FIG. 1 illustrates an exemplary (and simplified) wireless communication system, according to some embodiments. It is noted that the system of FIG. 1 is merely one example of a possible system, and that features of this disclosure may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, LTE, LTE-A, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE and 1×RTT (or LTE and GSM), and separate radios for communicating using each of Wi-Fi and Bluetooth. Other configurations are also possible.

FIG. 3 illustrates an exemplary, simplified portion of a wireless communication system, such as a 3GPP compliant cellular network, according to some embodiments.

As shown, a UE 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, and serving gateway (SGW) 326. The EPC 100 may include various other devices and/or entities known to those skilled in the art as well.

Figure 4:
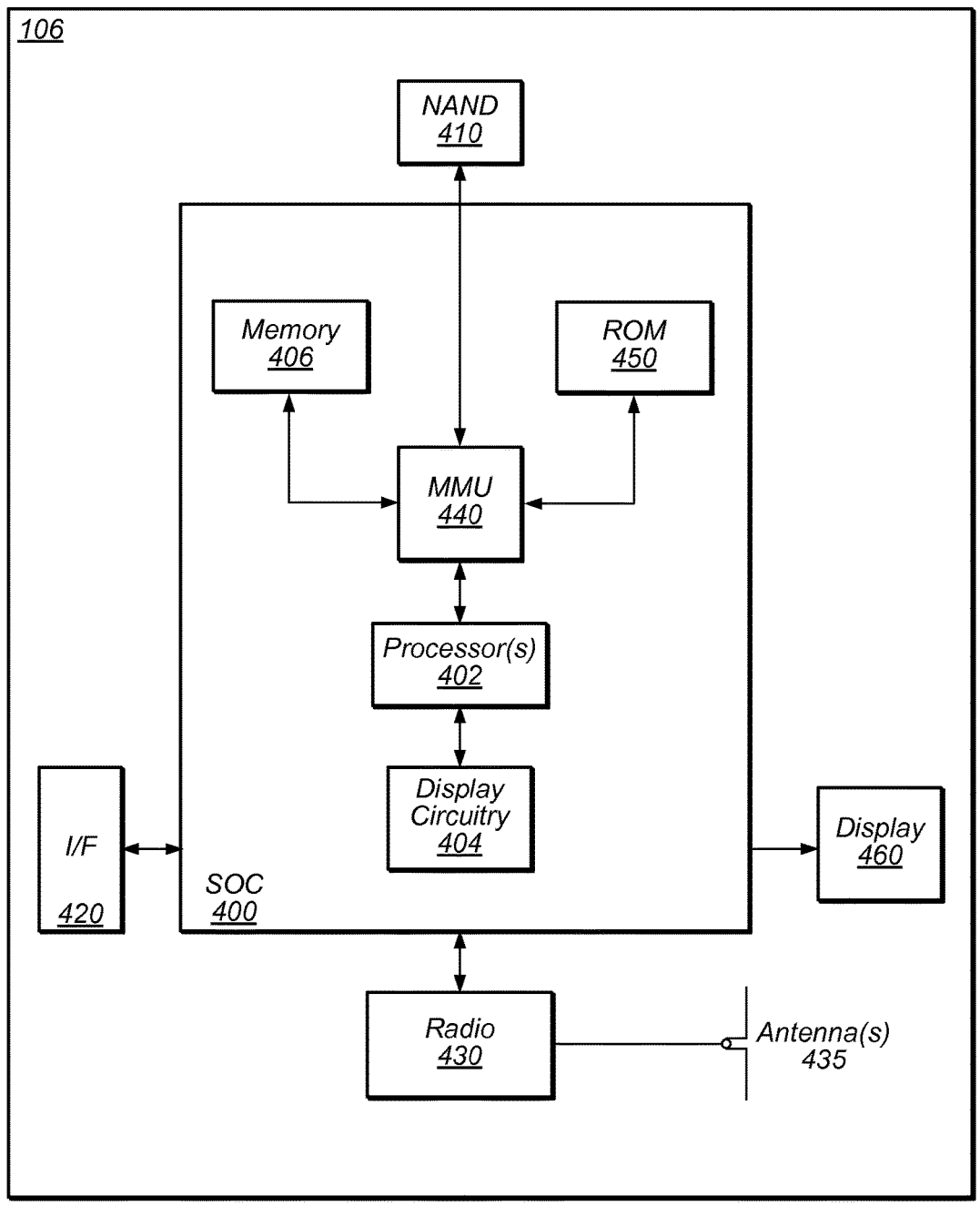
FIG. 4 illustrates an exemplary block diagram of a UE, according to some embodiments.

FIG. 4—Exemplary Block Diagram of a UE

FIG. 4 illustrates an exemplary block diagram of a UE 106. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, and wireless communication circuitry 430 (e.g., for LTE, CDMA2000, Bluetooth, WiFi, etc.).

As noted above, the UE 106 may be configured to communicate wirelessly using multiple wireless communication technologies. As further noted above, in such instances, the wireless communication circuitry 430 may include radio components which are shared between multiple wireless communication technologies and/or radio components which are configured exclusively for use according to a single wireless communication technology.

As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 435 to perform the wireless communication.

As described further subsequently herein, the UE 106 may include hardware and software components for implementing part or all of the methods described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
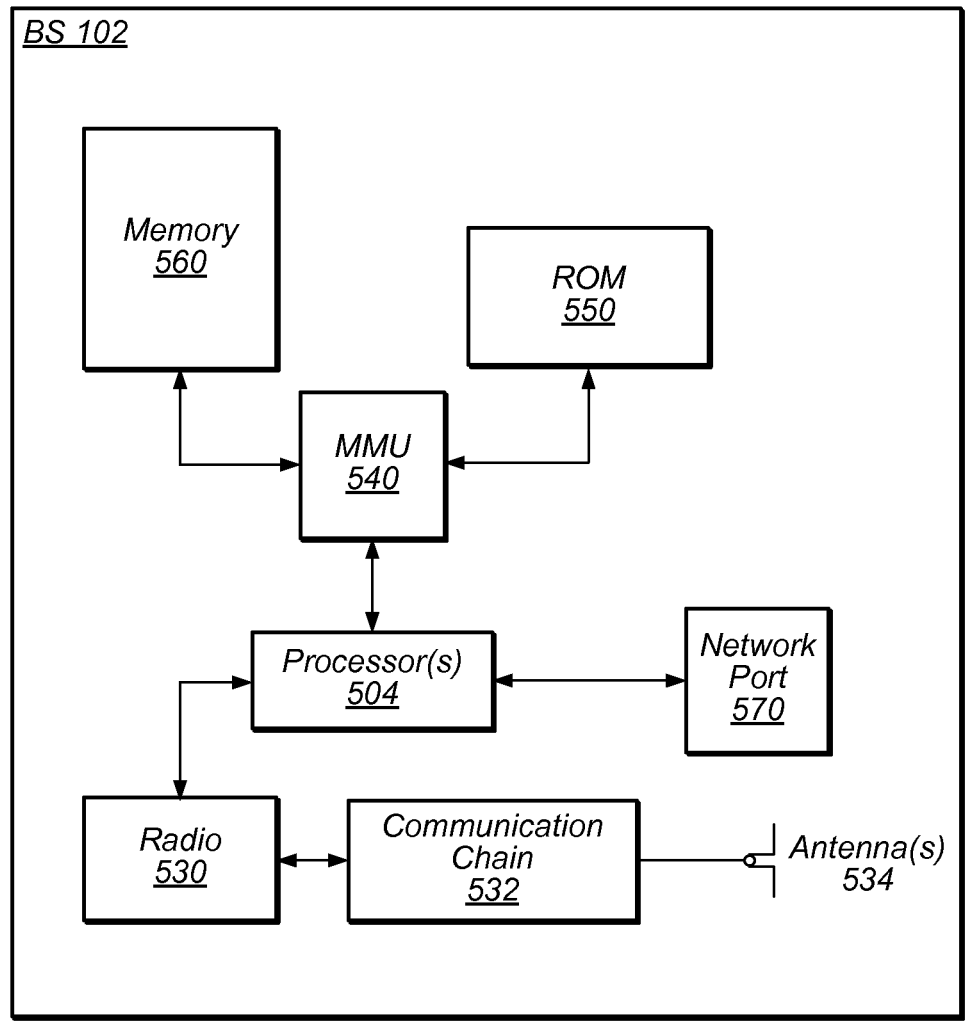
FIG. 5 illustrates an exemplary block diagram of a BS, according to some embodiments.

FIG. 5—Base Station

FIG. 5 illustrates an exemplary block diagram of a base station 102. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534, and possibly multiple antennas. The antenna(s) 534 may be configured to operate as a wireless transceiver and may be further configured to communicate with UE devices 106 via radio 530. The antenna(s) 534 communicates with the radio 530 via communication chain 532. Communication chain 532 may be a receive chain, a transmit chain or both. The radio 530 may be configured to communicate via various wireless communication technologies, including, but not limited to, LTE, LTE-A, GSM, WCDMA, CDMA2000, Wi-Fi, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 6:
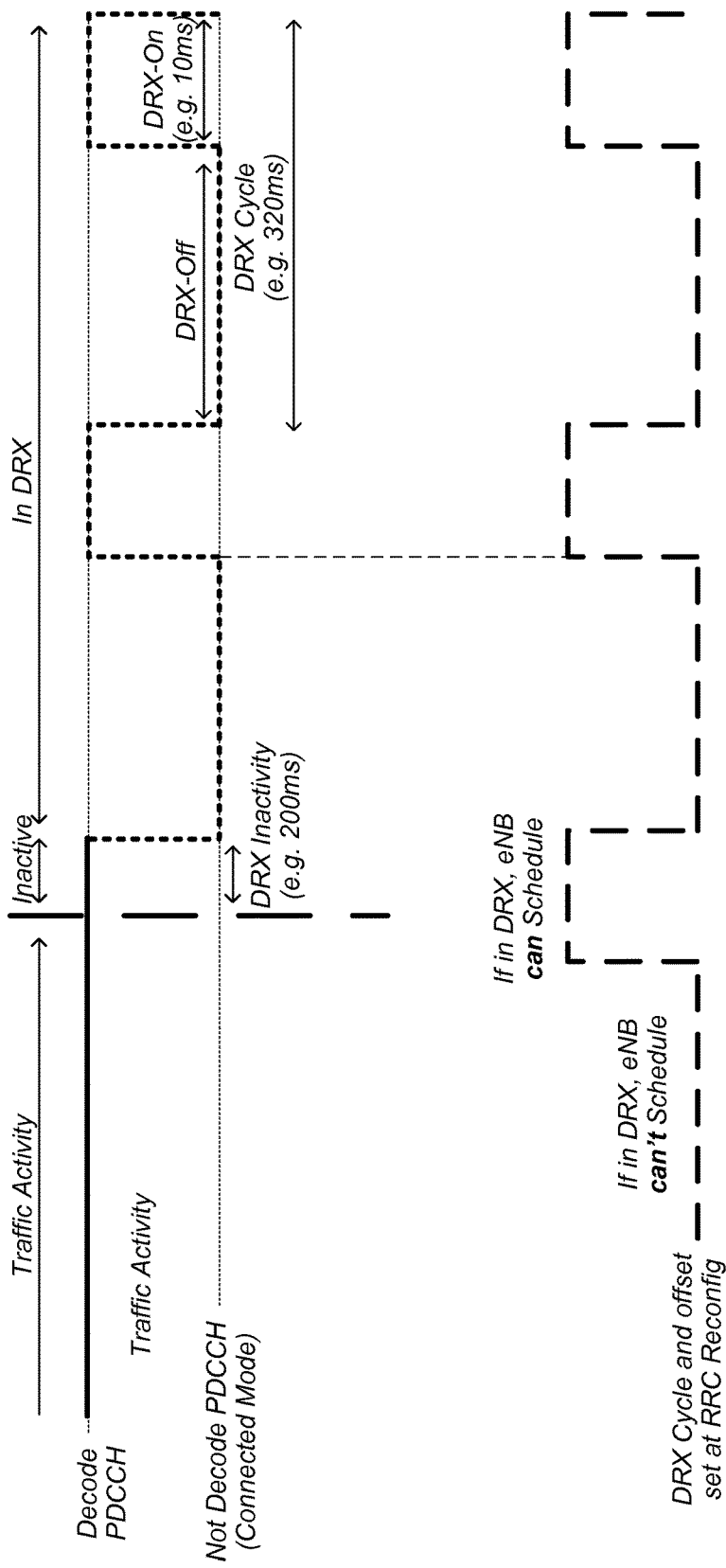
FIG. 6 illustrates exemplary aspects of possible C-DRX operation of a UE, according to some embodiments.
Figure 7:
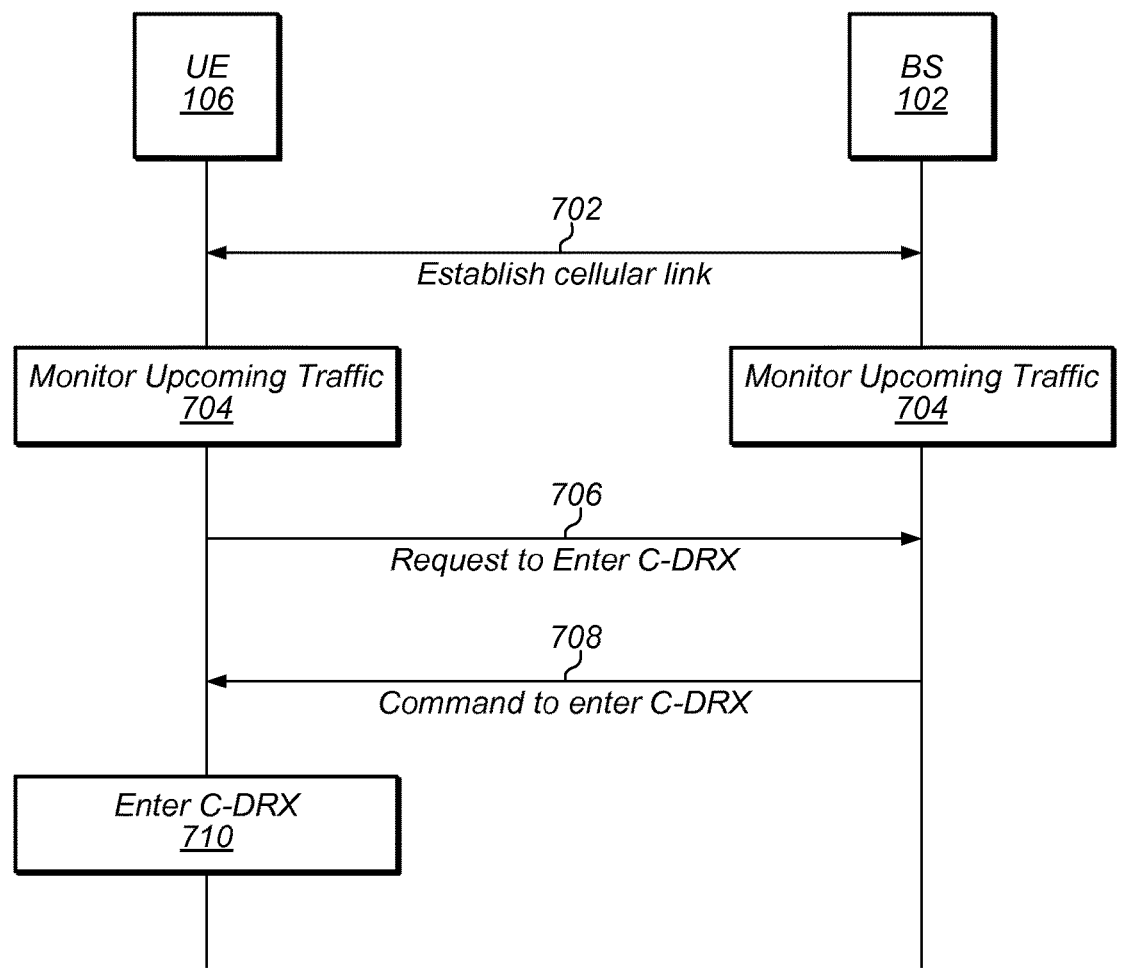
FIG. 7 is a communication flow diagram illustrating an exemplary method for adaptively managing C-DRX operation of a UE, according to some embodiments.

FIGS. 6-7—C-DRX Management

Currently, many UEs are capable of running a wide variety of data applications in parallel. Such diversity in applications creates a diversity in traffic patterns that in turn may be supported by wireless networks.

The unpredictable nature of such application profiles may lead to challenges in designing network operations that function efficiently under all scenarios. For example, different network design and operational decisions may have different impacts on UE performance considerations such as latency, throughput and power consumptions, such that trade-offs between such UE performance considerations may occur.

One network design and operation tradeoff may relate to balancing state change frequency (which may create additional network signaling and potentially congestion) with UE power consumption (e.g., connected mode may consume more power than idle mode).

According to certain radio access technologies (such as LTE, among various possibilities), a UE may be able to operate in either of an idle mode or a connected mode. For example, a UE attached to an LTE network may operate in one of an RRC_idle or RRC_connected state with respect to the network. In the idle mode, the UE may operate using discontinuous reception (DRX), which may allow the UE to switch off its radio receiver for a majority of the time and thereby reduce its power consumption. For example, in idle DRX the wireless device may periodically monitor the cell for paging information directed to the wireless device at scheduled intervals, and enter a low power state or "sleep" between such scheduled intervals. The UE may (at least in some instances) enter the idle mode upon initially attaching to a network or receiving a Radio Resource Control (RRC) connection release message from the network.

If the UE has application data to transmit or receive, the UE may first transition from the idle mode to the connected mode. The transition from idle to connected mode may be initiated by the UE (e.g., by way of a random access procedure or RACH) or by the network (e.g., by paging the wireless device). In the connected mode, a UE may be in active data transmission or in a connected DRX (C-DRX) mode. The C-DRX mode may be used by the UE if configured by the network, and may include following a configured pattern of on and off cycles. Various 'short' or 'long' DRX cycle lengths may be possible according to various C-DRX configurations.

The C-DRX mode may represent an attempt to improve the balance between excessive state transitions and excessive power consumption, as this may allow a UE to remain in the connected mode while still providing for the UE to switch off its radio receiver for a portion of the time, which may help save UE power without requiring a state transition. FIG. 6 illustrates exemplary characteristics of C-DRX according to one possible configuration. Note that FIG. 6 and the information provided with respect thereto are provided as being illustrative of certain possible exemplary aspects of C-DRX operation, and are not intended to be limiting to the disclosure as a whole. Numerous alternatives to and variations of the following details are also possible and should be considered within the scope of the present disclosure.

As shown, a UE in C-DRX may periodically 'sleep' (e.g., power down some or all radio components to save power) rather than continuously decode control channels (e.g., PDCCH in LTE). The base station (e.g., eNB in LTE) which provides a cell to which the UE is attached (i.e., the serving base station of the UE) may agree to not schedule data exchanges for the UE during designated sleep ("DRX-Off" or "off-duration") portions of each C-DRX cycle. According to the C-DRX configuration selected for the UE by the base station, such scheduling may instead occur during designated awake ("DRX-On" or "on-duration") portions of each C-DRX cycle. Generally, a UE may refrain from entering C-DRX for a configured length of time (e.g., the length of a DRX inactivity timer) after any traffic activity between the UE and the base station, but may enter C-DRX once the configured length of time has expired if no new traffic activity has occurred in the meantime.

The C-DRX parameters governing the C-DRX operation of a UE may be provided by the serving base station of the UE, for example in an RRC configuration or reconfiguration message. As one possibility, the parameters may include the DRX cycle length (i.e., the duration of one cycle of UE on/off time), the on-duration timer (i.e., the duration of time the UE monitors control channel(s) such as PDCCH during each DRX cycle), and the DRX inactivity timer (i.e., the duration of time for which the UE continuously monitors control channel(s) such as PDCCH after receiving a scheduling message before the UE may enter (or re-enter) C-DRX). At least in some instances, a DRX cycle offset (e.g., to ensure the UE and the base station are coordinated with respect to when the on- and off-duration portions of each DRX cycle of the UE occur) may also be included among the C-DRX parameters.

While the relative widths of the various C-DRX cycle parameters illustrated in FIG. 6 are presented with arbitrarily chosen sizes for the sake of clarity of the illustration, it should be noted that any of a variety of possible values may be selected for each of these parameters, as desired. For example, as one possibility, the inactivity timer value may be 200 ms, the DRX cycle length may be 320 ms, and the on-duration may be 10 ms. These values are provided by way of example only, and any number of other values (e.g., inactivity timer values of 50 ms, 100 ms, 150 ms, etc.; DRX cycle length values of 20 ms, 60 ms, 120 ms, etc.; on-duration values of 2 ms, 5 ms, 20 ms, etc.) are also possible.

As currently constructed, C-DRX may result in excessive UE power consumption. For example, while an ideal C-DRX mechanism might be tailored to each application and traffic pattern to save the most UE power, this level of fine-tuning for each traffic pattern may be considered impractical—hence, current C-DRX patterns may only crudely match changing traffic patterns.

Accordingly, FIG. 7 illustrates a method to dynamically adapt C-DRX operation to changing traffic patterns. The scheme shown in FIG. 7 may be used in conjunction with any of the computer systems or devices shown in the above Figures, among other devices. As one possibility (and as illustrated) the method may be performed between a UE 106 and a BS 102. Note that the scheme shown in FIG. 7 may be used in conjunction with LTE systems as one possibility, or in conjunction with any of various other cellular systems, as desired.

In various embodiments, some of the elements of the scheme shown may be performed concurrently, in a different order than shown, or may be omitted. Additional elements may also be performed as desired. As shown, the scheme may operate as follows.

In 702, a cellular link may be established between the UE 106 and the BS 102. Establishing the cellular link may include the UE 106 attaching to a cell provided by the BS

102. Attaching to the cell may include acquiring system information (e.g., which the base station may broadcast in a system information block) and registering with the network of the BS 102. The wireless device may initially operate in an idle mode upon attaching to the cell. At least in some instances, establishing the cellular link may also include the UE transitioning to connected mode with the BS 102.

In 704, either or both of the BS 102 and the UE 106 may monitor upcoming traffic/upcoming scheduling information for the UE 106. It may be the case that the BS 102 has knowledge of upcoming data to be transmitted to the UE 106 on the downlink and may be able to infer whether or not there is upcoming data to be received from the UE 106 on the uplink. For example, the BS 102 may be responsible for scheduling uplink transmissions based on uplink scheduling requests from the UE 106, so when there is no pending scheduling request (e.g., the UE 106 has not informed the BS 102 that it has data to send in the uplink), the UE 106 will not be scheduled an uplink (e.g., PUSCH) grant. Thus, by monitoring upcoming traffic for the UE 106, the BS 102 may be able to determine when a scenario is occurring in which there is no upcoming traffic for at least a certain amount of time, such that the UE 106 would be able to enter C-DRX (e.g., possibly prior to expiration of a C-DRX inactivity timer of the wireless device) to save power without delaying application traffic to or from the UE 106.

The UE 106 may not have as detailed knowledge of upcoming downlink traffic to the UE 106 as the BS 102, at least in some instances, but the UE 106 may have knowledge of upcoming data to be transmitted to the BS 102 on the uplink, for example based on the contents (or lack thereof) of RLC buffers of the UE 102. Thus, at least in some instances, the UE 106 may be able to determine when a scenario is occurring in which there is at least no upcoming uplink traffic for at least a certain amount of time, such that the UE 106 would be able to enter C-DRX to save power without delaying application traffic from the UE 106 if it happens to be the case that there is also no upcoming downlink traffic for some or all of that amount of time.

Based on such monitoring of its upcoming traffic (e.g., if the UE 106 does detect such a scenario, and is not yet in C-DRX), in 706 the UE 106 may (e.g., optionally) transmit a request to enter C-DRX to the BS 102. The request may, for example, indicate to the BS 102 that the UE 106 is willing to enter C-DRX prior to expiration of the C-DRX inactivity timer. If desired, the request (or a separate indication, if desired) may further indicate a duration of time for which the UE 106 could remain asleep without impacting UL operations. The request may take any desired form, such as a MAC control element (CE), an IE in an RRC message, etc.

In 708, the BS 102 may transmit a command to enter C-DRX to the UE 106. Transmitting the command may be based at least in part on monitoring upcoming traffic for the UE 106 by the BS 102. In some instances, the command may also or alternatively be provided at least partially in response to the request to enter C-DRX received from the UE 106. Alternatively, the BS 102 may provide the command unprompted (i.e., without receiving a request to enter C-DRX from the UE 106). In other words, the BS 102 may either unilaterally determine based on monitoring UE traffic considerations and/or the condition (e.g., empty/full) of the base station's data buffer for the UE 106 to put the UE 106 into C-DRX, or may determine to do so based both on UE traffic considerations and a request such as described herein from the UE 106, or may determine put the UE 106 into C-DRX based solely on the request to enter C-DRX received from the UE 106.

The BS 102 may also determine parameters of the C-DRX mode for the wireless device, and may also indicate (e.g., in the command to enter C-DRX or in a different indication) the determined parameters of the C-DRX mode to the wireless device. The parameters of the C-DRX mode may be determined based on any of various considerations, potentially including packet size and/or timing patterns of previous traffic between the base station and the wireless device, application traffic characteristics of a primary application active on the UE 106 (e.g., as further described below herein), and/or any other desired considerations.

Thus the BS 102 may place the UE 106 in a C-DRX pattern to save power. At least in some instances, the BS 102 may also determine, based on upcoming scheduling information for the UE 106, that the UE 106 may be able to skip waking up for a certain number of C-DRX cycle on-durations upon initially transitioning to the C-DRX mode. In such an instance, the BS 102 may further indicate (e.g., in the command to enter C-DRX or in a different indication) to the UE a number of C-DRX cycles through which the UE 106 should remain in a low power state (e.g., sleeping and not decoding the control channel even during the on-duration portion of those C-DRX cycles). In other words, the BS 102 may also decide and signal to the UE 106 for how many DRX ON period cycles the UE 106 can stay off (i.e. skip) to save additional battery. This may also be at least partially determined based on information received from the UE 106 (e.g., based on an indication of a duration of time for which the UE 106 could remain asleep without impacting UL operations), at least in some instances. The command may take any desired form, such as a MAC control element (CE), an IE in an RRC message, etc. As one specific possibility, the command may take the form of a MAC CE DRX command. For example, in LTE, this could be achieved in either of the following two ways:

a. The eNB may send the MAC CE DRX command and a new (e.g., separate) MAC CE with a LCID that is currently described as reserved (e.g., in 3GPP TS 36.321) that contains the number of C-DRX cycles the UE will sleep. These two MAC CEs may be sent in the same MAC payload (i.e., in the same transmission time interval (TTI)).

b. The eNB may send a new MAC CE (i.e., having a LCID that is currently described as reserved) that will contain both the command to sleep and the number of DRX cycles to sleep.

In 710, the UE 106 may enter C-DRX operation based on the command to enter C-DRX. Thus, the UE 106 may sleep, possibly prior to expiration of the C-DRX inactivity timer of the UE 106, and may remain in the low power state through the indicated number of C-DRX cycles. In other words, for each C-DRX cycle of the indicated number of next C-DRX cycles, the UE 106 may not wake up to monitor the control channel(s) even during the on-duration portions of those C-DRX cycles. The BS 102 may refrain from scheduling transmissions and/or providing grants during the indicated number of C-DRX cycles after sending the command, so that the UE 106 may not miss any scheduling information or transmissions as a result of sleeping through (skipping) the indicated number of C-DRX cycles.

As previously noted, the UE 106 and/or the BS 102 may monitor upcoming traffic in order to determine when it may be possible for the UE 106 to opportunistically enter C-DRX. It should also be noted that any number of other factors may be considered by the BS 102 and/or the UE 106 in addition to or as alternatives to simply determining whether or not there is upcoming traffic for the UE 106 for a given duration of time when determining whether or not to command the UE 106 to enter C-DRX and how many (if any) C-DRX cycles to indicate to the UE 106 to skip. In some instances, the UE 106 and/or the BS 102 may analyze previous and/or current traffic between the UE 106 and the BS 102 as part of determining whether or not the UE 106 should enter C-DRX and for how many C-DRX cycles the UE 106 should remain asleep after transitioning to C-DRX.

For example, any or all of the following may be considered when determining to provide a command to enter C-DRX to a UE 106 and to determine a number of C-DRX cycles to indicate to skip: traffic conditions and/or patterns; amount of data for an application; number of applications running on the UE 106 that have traffic; priority of traffic based on specific application or application type (e.g., application types with low latency requirements such as voice traffic or interactive gaming might have highest priority, as one possibility); signal to noise ratio (SNR); interference; and/or any of various other considerations. Note also that the priority of traffic (e.g., based on application type) may be predetermined or may dynamically change (for example based on amount of traffic it generates during a period of time), as desired.

In some instances, the UE 106 and/or the BS 102 may buffer certain data for transmission while the UE is sleeping (e.g., through an indicated number of C-DRX cycles or between C-DRX cycles) and bundle that data together with other data for transmission at a later time (e.g., during the next on-duration portion of a C-DRX cycle when the UE 106 will be monitoring the control channel(s)). For example, the data traffic from different applications with different priorities and/or traffic patterns can be bundled with application data from a "primary application". The primary application may be any of various applications and may be selected as the primary application based on any of various possible considerations, as desired. Note additionally that the primary application may be an application which is explicitly identified as being active or an application which is inferred to be active based on observed traffic patterns (e.g., if no explicit indication of application or application type is available). As one possibility, an application which follows certain predictable behavior (e.g., a voice or video calling application, etc.) and has some latency constraints (e.g., a real-time application) may be considered the primary application. As the primary application in such a case may have a target latency (e.g., based on application needs and/or priority level) and may exhibit a periodic traffic pattern, in some instances the C-DRX cycle of the UE 106 may be configured specifically based on the primary application. For example, C-DRX cycle characteristics (e.g., C-DRX cycle length, on-duration length, and/or inactivity timer length, among various possibilities) for the UE 106 may be selected by the base station 102 based on latency considerations and/or a typical traffic periodicity of the primary application (e.g., such that the C-DRX cycle length matches the traffic periodicity of the primary application).

Thus, in order to maintain the C-DRX pattern for the primary application and maximize UE power conservation and/or network resource efficiency, the UE 106 and/or the BS 102 may bundle data for traffic of best effort application (s) and the primary application(s), and the best effort traffic will be sent along with the primary application traffic.

The BS 106 may determine which application of those applications of the UE 106 with active traffic is considered the primary application in any of various ways. As one possibility, the BS 106 may analyze previous traffic for periodicity and/or fixed payload transmissions, which may be indicative of a high-priority and/or latency sensitive application. In other words, the BS 106 may be able to infer or learn the characteristics of the primary application, select C-DRX cycle characteristics based on those characteristics and bundle other application data accordingly without direct knowledge of the precise application which it has determined is the primary application. As another possibility, the BS 106 may analyze previous traffic for priority indications. For example, QCI values of previous traffic may be considered, and if there is traffic with QCI=1, this may be considered primary application traffic. If desired, QCI or other priority labeling of previous application traffic may be considered in combination with observations of traffic patterns of previous application traffic and/or any of various other desired considerations to determine a primary application (or to infer characteristics of the primary application). Note also that the UE 106 may utilize similar techniques to determine the primary application and to bundle non-primary application traffic with primary application traffic, if desired.

Thus, according to the method of FIG. 7, a BS 102 and a UE 106 may be able to adaptively manage C-DRX operation of the UE 106 based at least in part on the characteristics of application traffic being exchanged between the UE 106 and the BS 102. The techniques described herein may allow for power consumption of the UE 106 to be reduced substantially while also meeting the latency and quality of service requirements of applications exchanging network traffic by way of the base station 102.

It should be noted that the method of FIG. 7 may be repeated any number of times, as desired, including performing the method multiple times over the course of a communication session between a particular UE and a base station, and/or performing the method between a base station and each of multiple UEs served by the BS. It should further be noted that details of the method may vary between different implementations or iterations; for example, the "skip count" or number of C-DRX cycles indicated to a UE to skip with a command to enter C-DRX may vary depending on traffic conditions, application types and requirements of active applications, network congestion, and/or other factors, and thus may differ on different occasions.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for a base station to manage connected mode discontinuous reception (C-DRX) operation of a wireless device, the method comprising:
   by the base station:
   establishing a cellular link with a wireless device;
   monitoring upcoming traffic with the wireless device;
   determining, based on said monitoring, a first number of C-DRX cycles for the wireless device to remain in a low power state;
   providing, prior to the wireless device entering C-DRX, a command to cause the wireless device to:
   enter the low power state;
   remain in the low power state for the first number of C-DRX cycles prior to entering C-DRX; and
   enter C-DRX, wherein said entering C-DRX includes, for a plurality of C-DRX cycles subsequent to the first number of C-DRX cycles:
   sleeping during an off-duration of each respective C-DRX cycle of the plurality C-DRX cycles; and
   monitoring a control channel during an on-duration of each respective C-DRX cycle of the plurality C-DRX cycles.

2. The method of claim 1, the method further comprising: analyzing previous traffic with the wireless device; and selecting C-DRX cycle characteristics for the wireless device based on analyzing previous traffic with the wireless device.

3. The method of claim 2,
wherein the previous traffic with the wireless device is analyzed for packet size patterns.

4. The method of claim 2,
wherein analyzing previous traffic with the wireless device comprises determining when previous traffic with the wireless device comprises a periodic fixed payload traffic pattern,
wherein selecting C-DRX cycle characteristics for the wireless device based on analyzing previous traffic with the wireless device comprises aligning the C-DRX cycle of the wireless device with a period of the periodic fixed payload traffic pattern when previous traffic with the wireless device does comprise a periodic fixed payload traffic pattern.

5. The method of claim 2,
wherein analyzing previous traffic with the wireless device comprises determining Quality of Service Class Identifier (QCI) values of previous traffic with the wireless device to determine a primary application that is active on the cellular link with the wireless device,
wherein selecting C-DRX cycle characteristics for the wireless device based on analyzing previous traffic with the wireless device comprises aligning the C-DRX cycle of the wireless device with the primary application.

6. The method of claim 5, the method further comprising: bundling best effort application data for the wireless device with primary application data for the wireless device.

7. The method of claim 1,
wherein the plurality C-DRX cycles are consecutive C-DRX cycles.

8. A cellular base station, comprising:
a radio; and
a processor operably coupled to the radio;
wherein the radio and the processor are configured to:
   establish a cellular link with a wireless device;
   monitor upcoming traffic with the wireless device;
   determine, based on said monitoring, a first number of C-DRX cycles for the wireless device to remain in a low power state;
   provide, prior to the wireless device entering C-DRX, a command to cause the wireless device to:
   enter the low power state;
   remain in the low power state for the first number of C-DRX cycles prior to entering C-DRX; and
   enter C-DRX, wherein to enter C-DRX includes, for a plurality of C-DRX cycles subsequent to the first number of C-DRX cycles:
   sleeping during an off-duration of each respective C-DRX cycle of the plurality C-DRX cycles; and
   monitoring a control channel during an on-duration of each respective C-DRX cycle of the plurality C-DRX cycles.

9. The cellular base station of claim 8, wherein the radio and the processor are further configured to:
determine C-DRX mode parameters for the wireless device based at least in part on timing patterns of previous traffic between the base station and the wireless device;
wherein the command further indicates the determined C-DRX mode parameters.

10. The cellular base station of claim 8, wherein the radio and the processor are further configured to:
analyze previous traffic with the wireless device to determine a primary application that is active on the cellular link with the wireless device based at least in part on Quality of Service Class Identifier (QCI) values of previous traffic with the wireless device, and
select C-DRX mode parameters for the wireless device based on analyzing previous traffic with the wireless device to align the C-DRX cycle of the wireless device with application traffic timing of the primary application.

11. The cellular base station of claim 10, wherein the radio and the processor are further configured to:
bundle best effort application data for the wireless device with primary application data for the wireless device.

12. The cellular base station of claim 8, wherein the radio and the processor are further configured to:
prior to the command, receive a request to enter C-DRX from the wireless device,
wherein providing the command is based at least in part on the request to enter the C-DRX mode.

13. The cellular base station of claim 8,
wherein the command is provided by way of a media access control (MAC) control element (CE).

14. The cellular base station of claim 8, wherein the radio and the processor are further configured to:
- analyze previous traffic with the wireless device;
  - wherein determining the first number of C-DRX cycles is further based on said analyzing the previous traffic with the wireless device.

15. An apparatus for managing connected mode discontinuous reception (C-DRX) operation of a wireless device, the apparatus comprising:
- a processor configured to cause the wireless device to:
  - establish a cellular link with a base station;
  - operate in a first mode other than C-DRX;
  - receive, while operating in the first mode other than C-DRX, a command to:
    - enter a low power state;
    - remain in the low power state for an indicated number of C-DRX cycles prior to entering C-DRX; and
    - enter C-DRX, wherein entering C-DRX includes, for a plurality of C-DRX cycles subsequent to the indicated number of C-DRX cycles:
      - sleeping during an off-duration of each respective C-DRX cycle of the plurality C-DRX cycles; and
      - monitoring a control channel during an on-duration of each respective C-DRX cycle of the plurality C-DRX cycles.

16. The apparatus of claim 15, wherein the processor is further configured to:
- monitor upcoming traffic with the base station;
- prior to entering C-DRX, transmit a request to enter C-DRX to the base station based on monitoring upcoming traffic with the base station,
- wherein the command indicating to the wireless device to enter C-DRX is received in response to the request to enter C-DRX.

17. The apparatus of claim 16, wherein the processor is further configured to:
- prior to entering C-DRX:
  - determine a duration of time for which the wireless device could remain asleep without impacting uplink operations of the wireless device based on monitoring upcoming traffic with the base station; and
  - provide an indication of the determined duration of time for which the wireless device could remain asleep without impacting uplink operations of the wireless device.

18. The apparatus of claim 16, wherein the processor is further configured to, while in C-DRX:
- determine a primary application that is actively using the cellular link; and
- bundle best effort application data with primary application data for uplink transmissions to the base station.

19. The apparatus of claim 18,
wherein the primary application comprises an application having a periodic traffic pattern.

20. The apparatus of claim 16,
wherein the first mode other than C-DRX is connected mode, wherein the command is received prior to expiration of a C-DRX inactivity timer of the wireless device, wherein the wireless device enters C-DRX prior to expiration of the C-DRX inactivity timer of the wireless device based on the command.

* * * * *